United States Patent
Ferrari et al.

(10) Patent No.: US 11,576,364 B2
(45) Date of Patent: Feb. 14, 2023

(54) SYSTEM AND METHOD FOR DETERMINING AGRICULTURAL VEHICLE GUIDANCE QUALITY BASED ON A CROP ROW BOUNDARY CONSISTENCY PARAMETER

(71) Applicant: CNH Industrial America LLC, New Holland, PA (US)

(72) Inventors: Luca Ferrari, Formigine (IT); Trevor Stanhope, Palos Hills, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 394 days.

(21) Appl. No.: 16/834,170

(22) Filed: Mar. 30, 2020

(65) Prior Publication Data

US 2021/0298285 A1    Sep. 30, 2021

(51) Int. Cl.
*A01M 7/00* (2006.01)
*B60K 31/00* (2006.01)
*G05D 1/02* (2020.01)

(52) U.S. Cl.
CPC ........... *A01M 7/0089* (2013.01); *B60K 31/00* (2013.01); *G05D 1/0246* (2013.01); *B60Y 2200/224* (2013.01); *B60Y 2400/3015* (2013.01)

(58) Field of Classification Search
CPC .. A01B 69/001; A01B 69/008; A01M 7/0089; B60K 31/00; B60W 2050/0057; B60W 2300/15; B60W 2555/00; B60Y 2200/224; B60Y 2400/3015; B62D 1/28; G01C 11/00; G05D 1/0246; G05D 2201/0201
See application file for complete search history.

(56) References Cited

U.S. PATENT DOCUMENTS

| | | |
|---|---|---|
| 6,490,539 B1 | 12/2002 | Dickson et al. |
| 7,725,233 B2 | 5/2010 | Hendrickson et al. |
| 7,792,622 B2 | 9/2010 | Wei et al. |

(Continued)

OTHER PUBLICATIONS

J.S. Guerrero, et al., "Automatic Expert System Based on Images for Accuracy Crop Row Detection in Maize Fields," Expert Systems with Applications 40.2 (2013): 656-664. Retrieved on Jul. 17, 2019 (9 pages) http://oa.upm.es/32345/1/INVE_MFM_2013_177714.pdf.

*Primary Examiner* — Peter D Nolan
*Assistant Examiner* — Ce Li Li
(74) *Attorney, Agent, or Firm* — Rebecca Henkel; Rickard Demille

(57) ABSTRACT

A system for determining agricultural vehicle guidance quality includes an imaging device configured to capture image data depicting a plurality of crops rows present within a field as an agricultural vehicle travels across the field. Additionally, the system includes a controller communicatively coupled to the imaging device. As such, the controller configured to determine a guidance line for guiding the agricultural vehicle relative to the plurality of crop rows based on the captured image data. Furthermore, the controller is configured to determine a crop row boundary consistency parameter associated with one or more crop rows of the plurality of crop row present within a region of interest of the captured image data. Moreover, the controller is configured to determine a quality metric for the guidance line based on the crop row boundary consistency parameter.

17 Claims, 5 Drawing Sheets

(56) References Cited

U.S. PATENT DOCUMENTS

| | | |
|---|---|---|
| 7,876,927 B2 | 1/2011 | Han et al. |
| 8,115,821 B2 | 2/2012 | Maki et al. |
| 8,121,345 B2 | 2/2012 | Jochem et al. |
| 8,433,483 B2 | 4/2013 | Han et al. |
| 8,594,927 B2 | 11/2013 | Louis et al. |
| 9,002,566 B2 | 4/2015 | Mcclure et al. |
| 9,446,791 B2 | 9/2016 | Nelson, Jr. et al. |
| 2002/0106108 A1* | 8/2002 | Benson .................. B62D 1/28 |
| | | 382/104 |
| 2018/0325012 A1 | 11/2018 | Ferrari et al. |
| 2019/0128864 A1* | 5/2019 | Pickett ................ A01C 21/007 |

* cited by examiner

SYSTEM AND METHOD FOR DETERMINING AGRICULTURAL VEHICLE GUIDANCE QUALITY BASED ON A CROP ROW BOUNDARY CONSISTENCY PARAMETER

FIELD OF THE INVENTION

The present disclosure generally relates to agricultural vehicles and, more particularly, to systems and methods for determining agricultural vehicle guidance quality based on a crop row inconsistency parameter determined as the vehicle travels across the field.

BACKGROUND OF THE INVENTION

Agricultural sprayers apply an agricultural substance (e.g., a pesticide) onto crops as the sprayer is traveling across a field. To facilitate such travel, sprayers are configured as self-propelled vehicles or implements towed behind an agricultural tractor or other suitable agricultural vehicle. A typical sprayer includes one or more booms on which a plurality of spaced apart nozzles is mounted. Each nozzle is configured to dispense or otherwise spray the agricultural substance onto underlying crops and/or weeds.

Many crops, such as corn and soybeans, are planted in rows. When spraying row crops, the sprayer is guided across the field such that the nozzles are aligned with the crop rows and/or the wheels of the sprayer are positioned between the crop rows. As such, a sprayer may include one or more imaging device(s) (e.g., a camera(s)) that capture images depicting the crop rows within the field. The captured images are then analyzed to identify the location(s) of one or more crop rows depicted within the images. Thereafter, the sprayer is guided across the field based on the identified crop row location(s). However, in certain instances, the captured image data may not allow for an accurate determination of the crop row location(s). In such instances, the nozzles may not be properly aligned within the crop rows and/or the wheels of the sprayer may not be properly positioned between the crop rows.

Accordingly, an improved system and method for determining agricultural vehicle guidance quality would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining agricultural vehicle guidance quality. The system includes an imaging device configured to capture image data depicting a plurality of crops rows present within a field as an agricultural vehicle travels across the field. Additionally, the system includes a controller communicatively coupled to the imaging device. As such, the controller configured to determine a guidance line for guiding the agricultural vehicle relative to the plurality of crop rows based on the captured image data. Furthermore, the controller is configured to determine a crop row boundary consistency parameter associated with one or more crop rows of the plurality of crop row present within a region of interest of the captured image data. Moreover, the controller is configured to determine a quality metric for the guidance line based on the crop row boundary consistency parameter.

In another aspect, the present subject matter is directed to a method for determining agricultural vehicle guidance quality. The method includes determining, with one or more computing devices, a guidance line for guiding an agricultural vehicle relative to a plurality of crop rows present within a field based on the image data depicting the plurality of crops rows as the agricultural vehicle travels across the field. Furthermore, the method includes determining, with the one or more computing devices, a crop row boundary consistency parameter associated with the plurality of crop rows depicted in the captured image data. Moreover, the method includes determining, with the one or more computing devices, a quality metric for the guidance line based on the crop row boundary consistency parameter. Additionally, the method includes initiating, with the one or more computing devices, a control action based on the determined quality metric.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
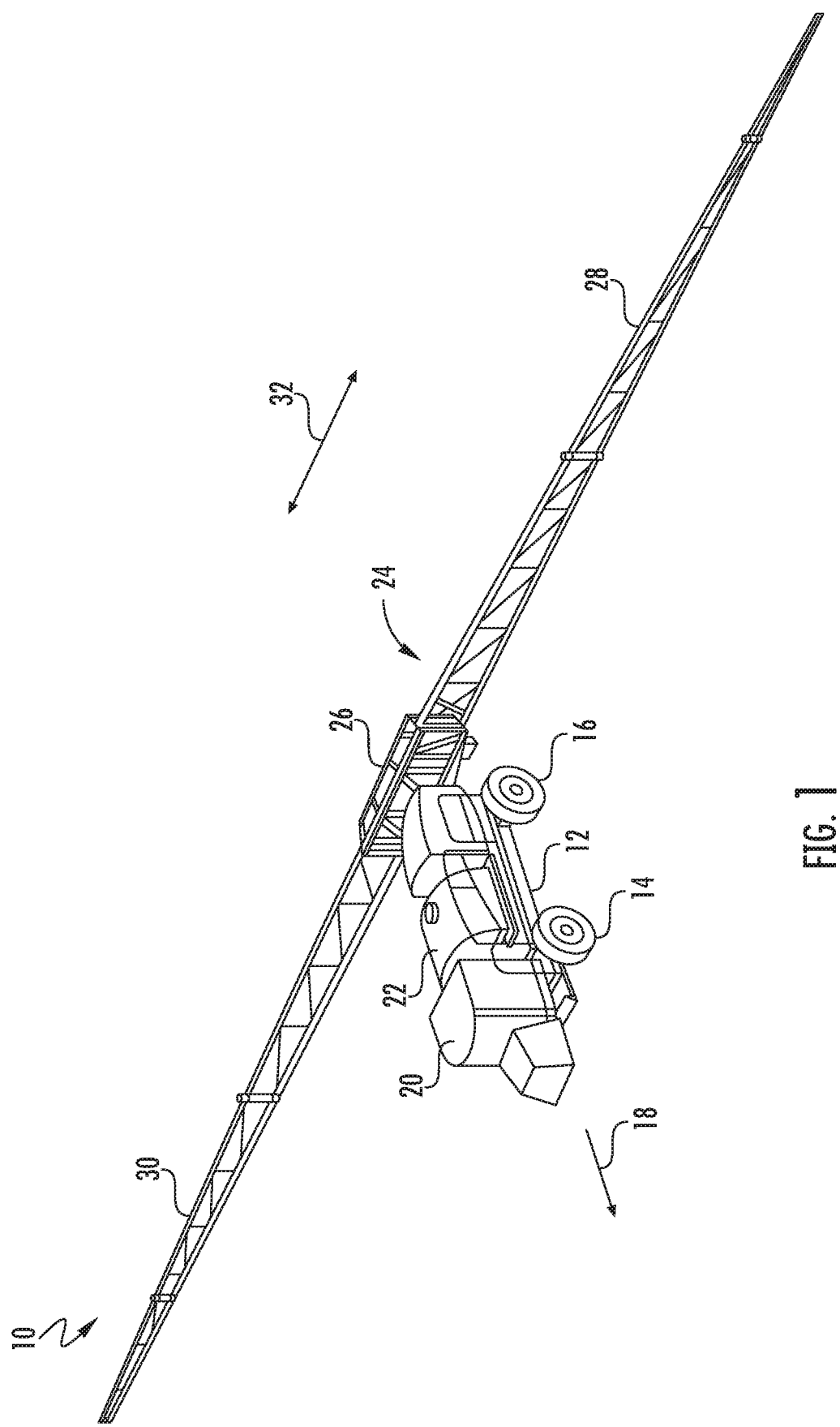
FIG. 1 illustrates a perspective view of one embodiment of an agricultural vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining agricultural vehicle guidance quality. As will be described below, the present subject matter may be used with a sprayer or any other agricultural vehicle guided across a field relative to one or more crop rows within the field. In this respect, the disclosed system may include an imaging device (e.g., a camera) coupled to or installed on the vehicle. The imaging device may, in turn, be configured to capture image data depicting a plurality of crops rows present within a field as the vehicle travels across the field to perform an operation (e.g., a spraying operation). Thereafter, a controller of the disclosed system may be configured to determine a guidance line for guiding the vehicle relative to the depicted crop rows based on the captured image data. For example, in one embodiment, the guidance line may correspond to a centerline defined between a pair of adjacent crops rows. In such an embodiment, the controller may be configured to analyze the captured image data to identify the locations of a pair of adjacent crop rows depicted therein. Thereafter, the controller may be configured to determine the location of a centerline between the identified crop row locations.

In accordance with aspects of the present subject matter, the controller may be configured to determine a quality metric for the guidance line. Specifically, the controller may be configured to analyze a region of interest of the captured image data to determine a crop row boundary consistency parameter associated with one or more crop rows present within the region of interest. For example, in several embodiments, the crop row boundary consistency parameter may correspond to a weed coverage parameter, such as the number of pixels within the region of interest associated with inter-row weeds (i.e., weeds between the crop rows) and/or intra-row weeds (i.e., weeds within the crop rows). In another embodiment, the crop row boundary consistency parameter may correspond to the color, height, and/or or canopy size of the crops present within the region of interest. Moreover, in a further embodiment, the crop row boundary consistency parameter may correspond to the consistency of the crop spacing. Thereafter, the controller may be configured to determine the quality metric for the guidance line based on the crop row boundary consistency parameter. The quality metric may, in turn, be indicative of the suitability of the captured image data for use in determining the guidance line.

In several embodiments, the controller may be configured to initiate one or more control actions based on the determined quality metric. Specifically, in some embodiments, the controller may be configured to compare the determined quality metric to a predetermined minimum quality metric value. When the determined quality metric falls below the predetermined minimum quality metric value, the controller may be configured to initiate the control action(s). For example, in one embodiment, the control action(s) may include adjusting the size and/or position of the region of interest of the captured image data. In another embodiment, the control action(s) may include reducing the ground speed of the vehicle. Additionally, in one embodiment, after initiating such control action(s), the controller may be configured to compare the determined quality metric to the predetermined minimum quality metric value. Thereafter, when the determined quality metric falls below the predetermined minimum quality metric value, the controller may be configured to determine the guidance line based on the location sensor data and a stored field map instead of the captured image data.

Figure 2:
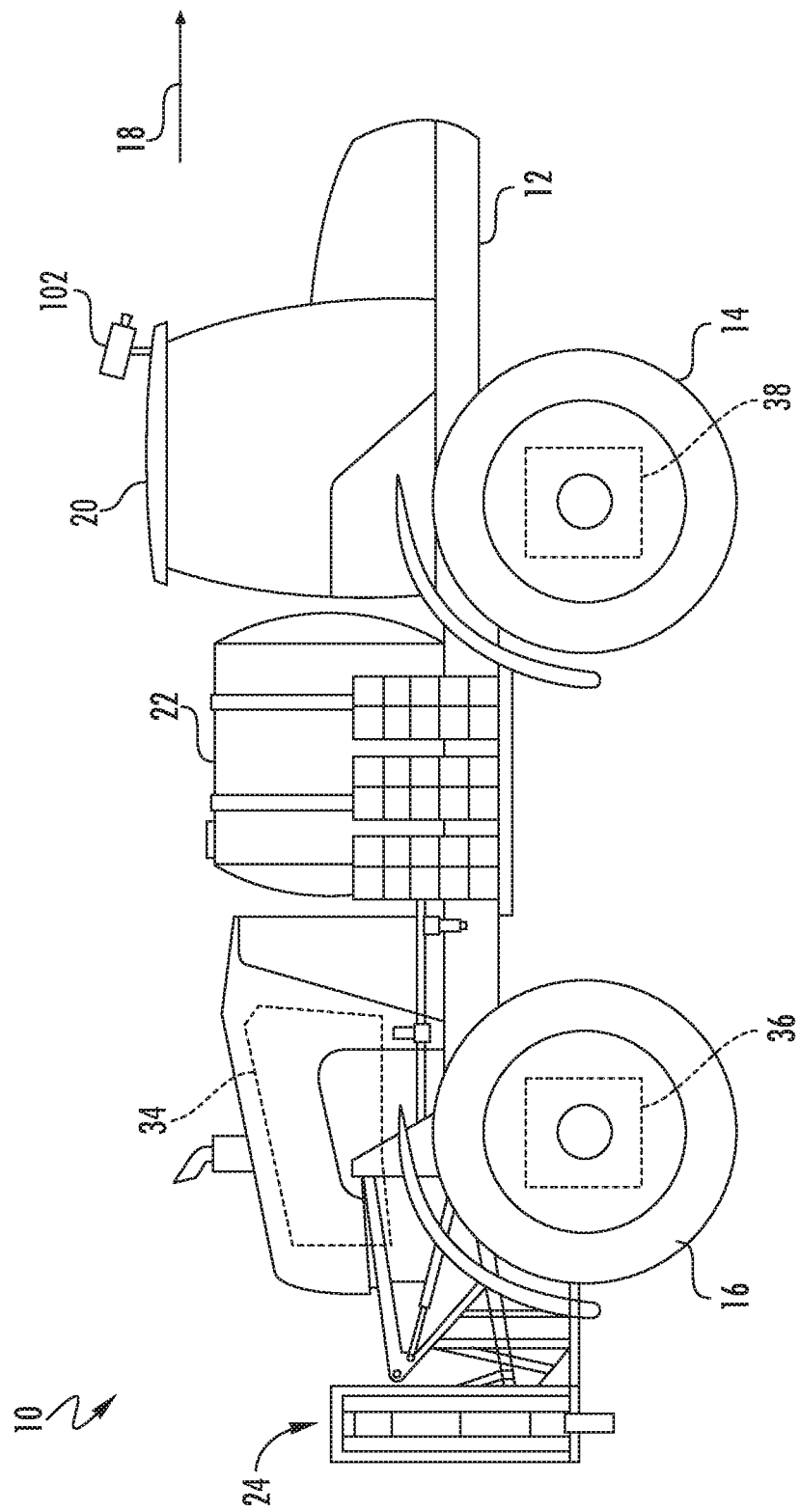
FIG. 2 illustrates a side view of the agricultural vehicle shown in FIG. 1, particularly illustrating various components thereof.

Referring now to the drawings, FIGS. 1 and 2 illustrate differing views of one embodiment of an agricultural vehicle 10 in accordance with aspects of the present subject matter. Specifically, FIG. 1 illustrates a perspective view of the agricultural vehicle 10. Additionally, FIG. 2 illustrates a side view of the agricultural vehicle 10, particularly illustrating various components of the agricultural vehicle 10.

In the illustrated embodiment, the agricultural vehicle 10 is configured as a self-propelled agricultural sprayer. However, it should be appreciated that, in alternative embodiments, the agricultural vehicle 10 may be configured as any other suitable agricultural vehicle that sprayer or any other agricultural vehicle guided across a field relative to one or more crop rows within the field, such as an agricultural tractor and an associated implement (e.g., a towable sprayer, an inter-seeder, a side-dresser, and/or the like).

As shown in FIGS. 1 and 2, the agricultural vehicle 10 may include a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural vehicle 10 relative to the ground and move the vehicle 10 in the direction of travel 18 across the field. Furthermore, the frame 12 may support an operator's cab 20 and a tank 22 configured to store or hold an agricultural substance, such as a pesticide, a fertilizer, or a nutrient. Additionally, the vehicle 10 may include a boom assembly 24 mounted on the frame 12. As shown, in one embodiment, the boom assembly 24 may include a center boom 26 and a pair of wing booms 28, 30 extending outwardly from the center boom 26 along a lateral direction 32, with the lateral direction 32 extending generally perpendicular the direction of travel 18. In general, a plurality of nozzles (not shown) mounted on the boom assembly 24 may be configured to dispense the agricultural substance stored in the tank 22 onto the underlying plants and/or soil. However, in alternative embodiments, the boom assembly 24 may include any other suitable number and/or configuration of boom sections. Furthermore, in other embodiments, the front wheels 14 of the vehicle 10 may be driven in addition to or in lieu of the rear wheels 16.

Referring particularly to FIG. 2, the agricultural vehicle 10 may include one or more devices or components for adjusting the speed at which the vehicle 10 moves across the field in the direction of travel 18. Specifically, in several embodiments, the agricultural vehicle 10 may include an engine 34 and a transmission 36 mounted on the frame 12. In general, the engine 36 may be configured to generate power by combusting or otherwise burning a mixture of air and fuel. The transmission 36 may, in turn, be operably coupled to the engine 34 and may provide variably adjusted gear ratios for transferring the power generated by the engine power to the driven wheels 16. For example, increasing the power output by the engine 34 (e.g., by increasing the fuel flow to the engine 34) and/or shifting the transmission 36 into a higher gear may increase the speed at which the agricultural vehicle 10 moves across the field. Conversely, decreasing the power output by the engine 34 (e.g., by decreasing the fuel flow to the engine 34) and/or shifting the transmission 36 into a lower gear may decrease the speed at which the agricultural vehicle 10 moves across the field.

Additionally, the agricultural vehicle 10 may include one or more braking actuators 38 that, when activated, reduce the speed at which the agricultural vehicle 10 moves across the field, such as by converting energy associated with the movement of the vehicle 10 into heat. For example, in one embodiment, the braking actuator(s) 38 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 38 may any other suitable hydraulic, pneumatic, mechanical, and/or electrical component(s) configured to convert the rotation of the rotating element(s) into heat. Furthermore, although FIG. 2 illustrates one braking actuator 38 provided in operative association with each of the steerable wheels 14, the agricultural vehicle 10 may include any other suitable number of braking actuators 38. For example, in one embodiment, the agricultural vehicle 10 may include one braking actuator 38 provided in operative association with each of the driven wheels 16 in addition to or in lieu of the steerable wheels 14.

It should be further appreciated that the configuration of the vehicle 10 \described above and shown in FIGS. 1 and 2 is provided only to place the present subject matter in an exemplary field of use. Thus, it should be appreciated that the present subject matter may be readily adaptable to any manner of vehicle configuration.

In accordance with aspects of the present subject matter, one or more imaging devices 102 may be installed on the vehicle 10 and/or an associated implement (not shown). In general, the imaging device(s) 102 may be configured to capture image data depicting a plurality of crops rows present within a field as the vehicle 10 travels across the field to perform an operation (e.g., a spraying operation) thereon. As will be described below, a controller may be configured to determine a guidance line for the vehicle 10 and quality metric associated with the determined guidance line based on the captured image data.

In general, the imaging device(s) 102 may correspond to any suitable sensing device(s) configured to detect or capture images or other image-like data depicting one or more crop rows present within the field across which the vehicle 10 is traveling. For example, in several embodiments, the imaging device(s) 102 may correspond to a suitable camera(s) configured to capture three-dimensional images of the crop row(s) present within its field of view. For instance, in a particular embodiment, the imaging device(s) 102 may correspond to a stereographic camera(s) having two or more lenses with a separate image sensor for each lens to allow the camera(s) to capture stereographic or three-dimensional images. However, in alternative embodiments, the imaging device(s) 102 may correspond to any other suitable sensing device(s) configured to capture image or image-like data, such as a monocular camera(s), a LIDAR sensor(s), and/or a RADAR sensor(s).

The imaging device(s) 102 may be installed at any suitable location(s) that allow the imaging device(s) 102 to capture image data depicting one or more crop rows within the field. For example, in the illustrated embodiment, an imaging device 102 is mounted on the roof of the cab 20. In such an embodiment, the imaging device 102 has a field of view directed at a portion of the field in front of the vehicle 10 relative to the direction of travel 18. As such, the imaging device 102 is able to capture images or other image data depicting the one or more crop rows in front of the vehicle 10. However, in alternative embodiments, the imaging device(s) 102 may be installed at any other suitable location(s), such as on the boom assembly 24. Additionally, any other suitable number of imaging devices 102 may be installed on the vehicle 10 or an associated implement (not shown), such as two or more imaging device(s) 102.

Figure 3:
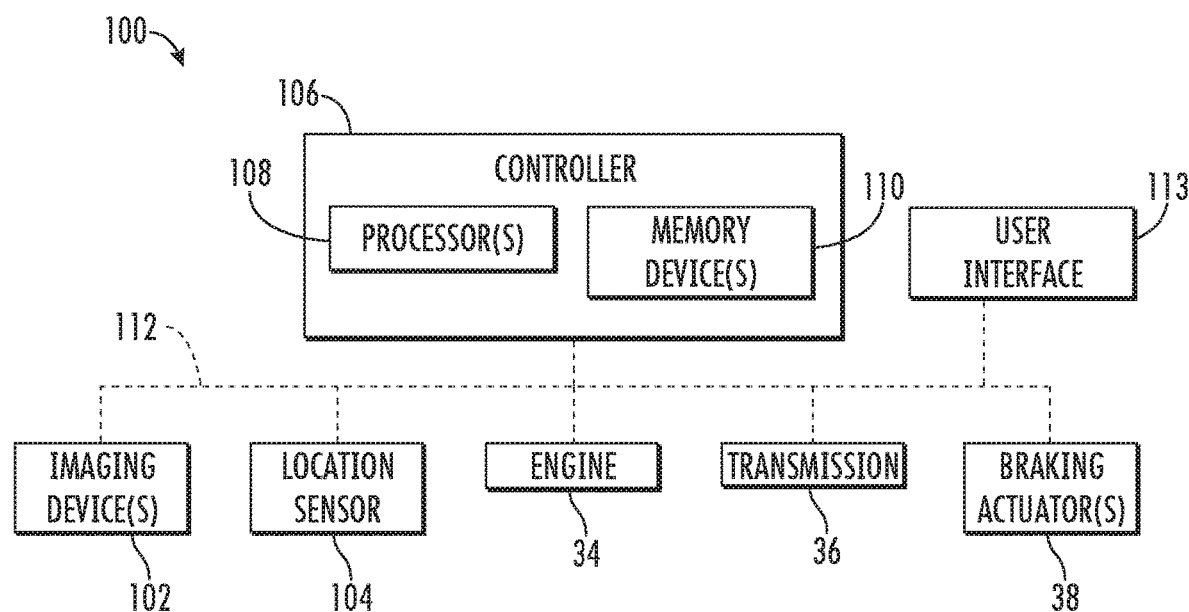
FIG. 3 illustrates a schematic view of one embodiment of a system for determining agricultural vehicle guidance quality in accordance with aspects of the present subject matter.

Referring now to FIG. 3, a schematic view of one embodiment of a system 100 for determining agricultural vehicle guidance quality is illustrated in accordance with aspects of the present subject matter. In general, the system 100 will be described herein with reference to the agricultural vehicle 10 described above with reference to FIGS. 1 and 2. However, it should be appreciated by those of ordinary skill in the art that the disclosed system 100 may generally be utilized with agricultural vehicles having any other suitable vehicle configuration.

As shown in FIG. 3, the system 100 may include a location sensor 104 provided in operative association with the vehicle 10. In general, the location sensor 104 may be configured to determine the current location of the vehicle 10 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 104 may be transmitted to a controller(s) of the vehicle 10 (e.g., in the form coordinates) and stored within the controller's memory for subsequent processing and/or analysis. For instance, the determined location from the location sensor 104 may be used to geo-locate the vehicle 10 within the field.

In accordance with aspects of the present subject matter, the system may also include a controller 106 positioned on and/or within or otherwise associated with the vehicle 10 or an associated implement (not shown). In general, the controller 106 may comprise any suitable processor-based device known in the art, such as a computing device or any suitable combination of computing devices. Thus, in several embodiments, the controller 106 may include one or more processor(s) 108 and associated memory device(s) 110 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 110 of the controller 106 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 110 may generally be configured to store suitable computer-readable instructions that, when implemented by the processor(s) 108, configure the controller 106 to perform various computer-implemented functions.

In addition, the controller 106 may also include various other suitable components, such as a communications circuit or module, a network interface, one or more input/output channels, a data/control bus and/or the like, to allow controller 106 to be communicatively coupled to any of the various other system components described herein (e.g., the engine 34, the transmission 36, the braking actuator(s) 38, imaging device(s) 102, and/or the location sensor 104). For instance, as shown in FIG. 3, a communicative link or interface 112 (e.g., a data bus) may be provided between the controller 106 and the components 34, 36, 38, 102, 104 to allow the controller 106 to communicate with such components 34, 36, 38, 102, 104 via any suitable communications protocol (e.g., CANBUS).

The controller 106 may correspond to an existing controller(s) of the vehicle 10, itself, or the controller 106 may correspond to a separate processing device. For instance, in one embodiment, the controller 106 may form all or part of a separate plug-in module that may be installed in association with the vehicle 10 to allow for the disclosed systems to be implemented without requiring additional software to be uploaded onto existing control devices of the vehicle 10.

In addition, the functions of the controller 106 may be performed by a single processor-based device or may be distributed across any number of processor-based devices, in which instance such devices may be considered to form part of the controller 106. For instance, the functions of the controller 106 may be distributed across multiple application-specific controllers, such as an engine controller, a transmission controller, an implement controller, and/or the like.

Furthermore, in one embodiment, the system 100 may also include a user interface 113. More specifically, the user interface 113 may be configured to provide feedback (e.g., notifications associated with the quality of the captured image data) to the operator of the vehicle 10. As such, the user interface 113 may include one or more feedback devices (not shown), such as display screens, speakers, warning lights, and/or the like, which are configured to provide feedback from the controller 106 to the operator. The user interface 113 may, in turn, be communicatively coupled to the controller 106 via the communicative link 112 to permit the feedback to be transmitted from the controller 106 to the user interface 113. In addition, some embodiments of the user interface 113 may include one or more input devices (not shown), such as touchscreens, keypads, touchpads, knobs, buttons, sliders, switches, mice, microphones, and/or the like, which are configured to receive user inputs from the operator. In one embodiment, the user interface 113 may be mounted or otherwise positioned within the cab 20 of the vehicle 10. However, in alternative embodiments, the user interface 113 may mounted at any other suitable location.

In several embodiments, the controller 106 may be configured to determine a guidance line for the agricultural vehicle 10. The guidance line may, in turn, be used to guide the vehicle 10 relative to crop rows present within the field as the vehicle 10 performs an operation (e.g., a spraying operation) on the field. For example, in some embodiments, the guidance line may correspond to a centerline positioned between a pair of adjacent crops rows. Moreover, in one embodiment, the guidance line may be determined based on captured image data. More specifically, as described above, one or more imaging device 102 may be supported or installed on the vehicle 10 such that the imaging device(s) 102 captures data depicting a plurality of crop rows present within the field. In this regard, as the vehicle 10 travels across the field to perform the operation thereon, the controller 106 may be configured to receive the captured image data from the imaging device(s) 102 (e.g., via the communicative link 112). The controller 106 may be configured to process/analyze the received image data to identify a centerline(s) positioned between one or more pairs of adjacent crop rows depicted in the image data. Thereafter, the controller 106 may be configured to control the operation of the vehicle 10 (e.g., a steering actuator (not shown) of the vehicle 10) such that a component of the vehicle 10 (e.g., one of the steerable wheels 14) is aligned with the guidance line in the lateral direction 32 as the vehicle 10 travels across the field. Such alignment may generally permit the vehicle 10 to travel across the field to dispense the agricultural substance stored in the tank 22 onto the desired portion of the field without damaging the crops. However, in alternative embodiments, the guidance line may correspond to any other suitable line for guiding the vehicle 10 relative to the crop rows present within the field.

Furthermore, the controller 106 may be configured to determine one or more crop row boundary consistency parameter(s) associated with one or more crop rows depicted within the received image data. Specifically, in several embodiments, the controller 106 may be configured to analyze the image data received from the imaging device(s) 102 using any suitable image processing techniques to determine the crop row boundary consistency parameter(s). Thereafter, the controller 106 may be configured to determine a quality metric associated with the guidance line based on the crop row boundary consistency parameter(s). The quality metric may, in turn, be indicative of the suitability of the captured image data for use in determining the guidance line. For instance, the controller 106 may include a look-up table(s) and/or suitable mathematical formula stored within its memory device(s) 110 that correlates the crop row boundary consistency parameter(s) to the quality metric.

Figure 4:
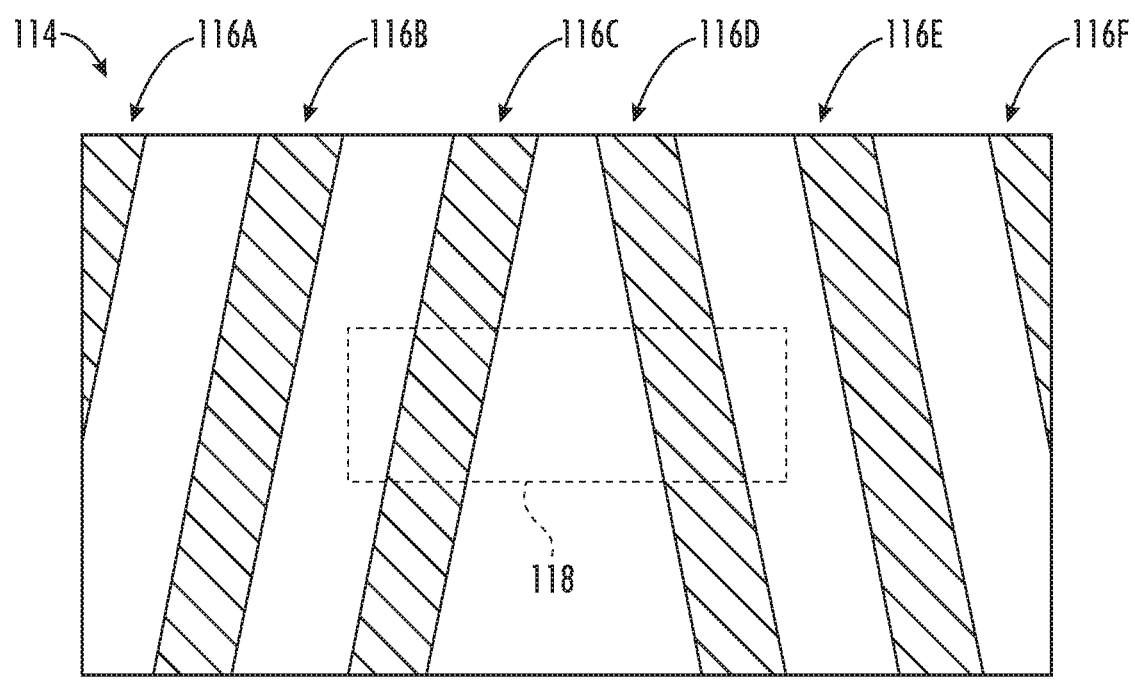
FIG. 4 illustrates an example image depicting a plurality of crop rows present within the field captured as an agricultural vehicle travels across the field.

In several embodiments, the controller 106 may be configured to analyze a region of interest of the captured image data to determine the crop row boundary consistency parameter(s). In general, the region of interest may be a portion of each image that is analyzed to determine the crop row boundary consistency parameter(s). Analyzing a region of interest of the captured image as opposed to the entire image may reduce the processing and memory requirements needed to determine crop row boundary consistency parameter(s). For example, FIG. 4 illustrates an example image 114 captured by the imaging device(s) 102 as the vehicle 10 travels across the field. More specifically, the image 114 depicts crop rows 116A, 116B, 116C, 116D, 116E, 116F. As shown, the region of interest (indicated by dashed lines 118) includes only a portion of crop rows 116C, 116D. In such instances, the controller 116 may be configured to analyze the portion of the field within the region of interest 118, namely the portion of rows 116C, 116D and soil present within the region of interest 118, to determine the crop row boundary consistency parameter(s). However, in alternative embodiments, the controller 106 may be configured to analyze the entirety of each captured image to determine crop row boundary consistency parameter(s).

The crop row boundary consistency parameter(s) may generally correspond to any parameter indicative of the suitability of the captured image data for use in determining the guidance line. In several embodiments, the crop row boundary consistency parameter(s) may include a weed coverage parameter(s). In general, greater weed coverage or pressure may generally obscure the crop row edges, making it more difficult for the controller 106 to identify the locations of the crop rows depicted within the captured image data. In such instances, the controller 106 may not accurately identify the crop rows within the received image data, thereby resulting in an inaccurate guidance line. As such, images depicting high weed coverage may be generally be less suitable for determining the guidance line than images depicting low weed coverage. For example, in one embodiment, the weed coverage parameter(s) may include the number of pixels within the region of interest of the captured images associated with inter-row weeds or weeds present between the crop rows. In such an embodiment, the controller 106 may be configured to iteratively analyze the region of interest of each received image to identify the number of pixels at all locations other than where the crop rows should be (e.g., based on planting data) that are not associated with the soil (e.g., based on color or texture). In one instance, the controller 106 may be configured to identify the number of green pixels at all locations within the region of interest other than where the crop rows should be. In another embodiment, the weed coverage parameter(s) may include the number of pixels within the region of interest within the captured images associated with intra-row weeds or weeds present within the crop rows. In such an embodiment, the controller 106 may be configured to iteratively analyze the region of interest of each received image to identify the number of pixels where the crop rows should be (e.g., based on planting data) that are not associated with the crops (e.g., based on texture). However, in alternative embodiments, the weed coverage parameter(s) may correspond to any other suitable parameter(s) associated with the presence of weeds within the field.

In another embodiment, the crop row boundary consistency parameter(s) may include a crop health parameter(s). In general, poor crop health may generally result in leaned over, spotty, and/or stunted crops, making it more difficult for the controller 106 to identify the locations of the crop rows depicted within the captured image data. In such instances, the controller 106 may not accurately identify the crop rows within the received image data, thereby resulting in an inaccurate guidance line. As such, images depicting crops having poor health may be generally be less suitable for determining the guidance line than images depicting crops having good health. For example, the crop health parameter(s) may include the color, height, and/or canopy size of the depicted crop rows. However, in alternative embodiments, the crop health parameter(s) may correspond to any other suitable parameter(s) associated with the health of crops present within the field.

In a further embodiment, the crop row boundary consistency parameter(s) may include a crop row spacing consistency parameter(s). In general, variable crop row spacing may make it more difficult for the controller 106 to identify the locations of the crop rows depicted within the captured image data. In such instances, the controller 106 may not accurately identify the crop rows within the received image data, thereby resulting in an inaccurate guidance line. As such, images depicting crops having a high level of crop row spacing variability may be generally be less suitable for determining the guidance line than images depicting crops having a low level of crop row spacing variability. For example, the crop row spacing consistency parameter(s) may include the difference between the minimum crop row spacing and the maximum crop row spacing and/or the standard deviation of the crop row spacing. However, in alternative embodiments, the crop row spacing consistency parameter(s) may correspond to any other suitable parameter(s) associated with the spacing of crop rows present within the field.

In yet another embodiment, the crop row boundary consistency parameter(s) may correspond to the dynamic range variation within the region of interest. In general, large variations in the dynamic range of the region of interest (e.g., due to shadows or direct sunlight) may make it more difficult for the controller 106 to identify the locations of the crop rows depicted within the captured image data. In such instances, the controller 106 may not accurately identify the crop rows within the region of interest, thereby resulting in an inaccurate guidance line. As such, the region of interest may be generally be less suitable for determining the guidance line when it has a high dynamic range variation. For example, in one embodiment, the dynamic range variation may correspond to the difference in intensity between the brightest or whitest pixels within the region of interest and the darkest or blackest pixels within the regions of interest. As will be described below, when the dynamic range variation of the region of interest exceeds a predetermined threshold value, the controller 106 may adjust the position of the region of interest within the captured images to position with less dynamic range variation, such as to a location that does not depict shadowing or direct sunlight.

In accordance with aspects of the present subject matter, the controller 106 may be configured to initiate a control action based on the determined quality metric. As described above, the controller 106 may be configured to determine the quality metric for the guidance line based on the crop row boundary consistency parameter(s), with the quality metric being indicative of the suitability of the captured image data for use in determining the guidance line. As such, in several embodiments, the controller 106 may be configured to compare the determined quality metric to a predetermined minimum quality metric value. When the determined quality metric falls below the predetermined minimum quality metric value (thereby indicating the captured image data is unsuitable for use in determining the guidance line), the controller 106 may be configured to initiate a one or more control action associated with improving the quality of the captured image data.

In several embodiments, the control action(s) may include reducing the ground speed of the vehicle 10. Reducing the ground speed of the vehicle 10 may, in turn, improve the quality of the captured image data. Specifically, the reduced ground speed may improve the resolution of the captured image data, thereby allowing the controller 106 to more accurately identify the edges of the crop rows. For example, the controller 106 may be configured to control the operation of the engine 34, the transmission 36, and/or the braking actuator(s) 38 to execute the desired reduction to the ground speed of the vehicle 10. Specifically, the controller 106 may be configured to transmit control signals to such components 34, 36, 38 (e.g., via the communicative link 112). The control signals may, in turn, instruct the components 34, 36, 38 to adjust their operation to decrease the ground speed of the vehicle 10 as desired.

In another embodiment, the control action(s) may include adjusting the size and/or position of the region of interest used to analyze of the captured image data. Adjusting the size and/or position of the region of interest may, in turn, improve the quality of the captured image data. For example, in certain instances, increasing the size of the region of interest may result a more accurate indication of the crop row edges by provide a view of a larger number of crop rows and/or a longer portion of the crop rows. In other instances, decreasing the size of the region of interest may provide a more accurate indication of the row edges by reducing the processing time necessary to identify the crop rows. Moreover, adjusting the position of the region of interest may allow the controller 106 analyze a portion of the images with crop row boundary consistency parameter(s) more conducive to determining the guidance line, such as a portion of the images with lower weed coverage and/or better crop health.

Moreover, in a further embodiment, the control action(s) may include providing a notification to the operator of the vehicle 10. Such notification may provide an indication that the determined quality metric has fallen below the predetermined minimum quality metric value. Specifically, in such an embodiment, the controller 106 may be configured to transmit instructions to the user interface 113 (e.g., via the communicative link 112). The instructions may, in turn, instruct the user interface 113 to provide a visual or audible notification or indicator to the operator that that the determined quality metric has fallen below the predetermined minimum quality metric value. Furthermore, the notification may indicate that the operator needs to take over control of the vehicle 10 or the vehicle 10 may be guided based on data from the location sensor 104 and not the captured image data, as will be described below.

Additionally, in several embodiments, when the control action(s) do not improve the quality of the received image data, the controller 106 may be configured to determine the guidance line based on captured location data and a stored field map. More specifically, after initiating the control action(s), the controller 106 may be configured to determine an updated quality metric and compare the updated quality metric to the predetermined minimum quality metric value. When the updated quality metric falls below the predetermined minimum quality metric value (thereby indicating the control action(s) were unable to improve the quality of the capture imaged image), the controller 106 may be configured to determine the guidance line based on captured location data and a stored field map in lieu of the captured image data. As mentioned above, a location sensor 104 may be configured to determine the location of the vehicle 10 within the field. In this respect, as the vehicle 10 travels across the field to perform the operation thereon, the controller 106 may be configured to receive coordinates from the location sensor 104 (e.g., via the communicative link 112). The controller 106 may then be configured to access a field map stored within its memory 110 to determine location of the vehicle relative to one or more crop rows present within the field. As such, the controller 106 may determine the guidance line for guiding the vehicle 10 based on determined location of the vehicle 10 within the field and the locations of the crop rows identified in the field map.

As used herein, a "field map" may generally correspond to any suitable dataset that correlates data to various locations within a field. Thus, for example, a field map may simply correspond to a data table that provides the locations of the crop rows present within the field. Alternatively, a field map may correspond to a more complex data structure, such as a geospatial numerical model that can be used to identify the locations of the crop rows present within the field.

Figure 5:
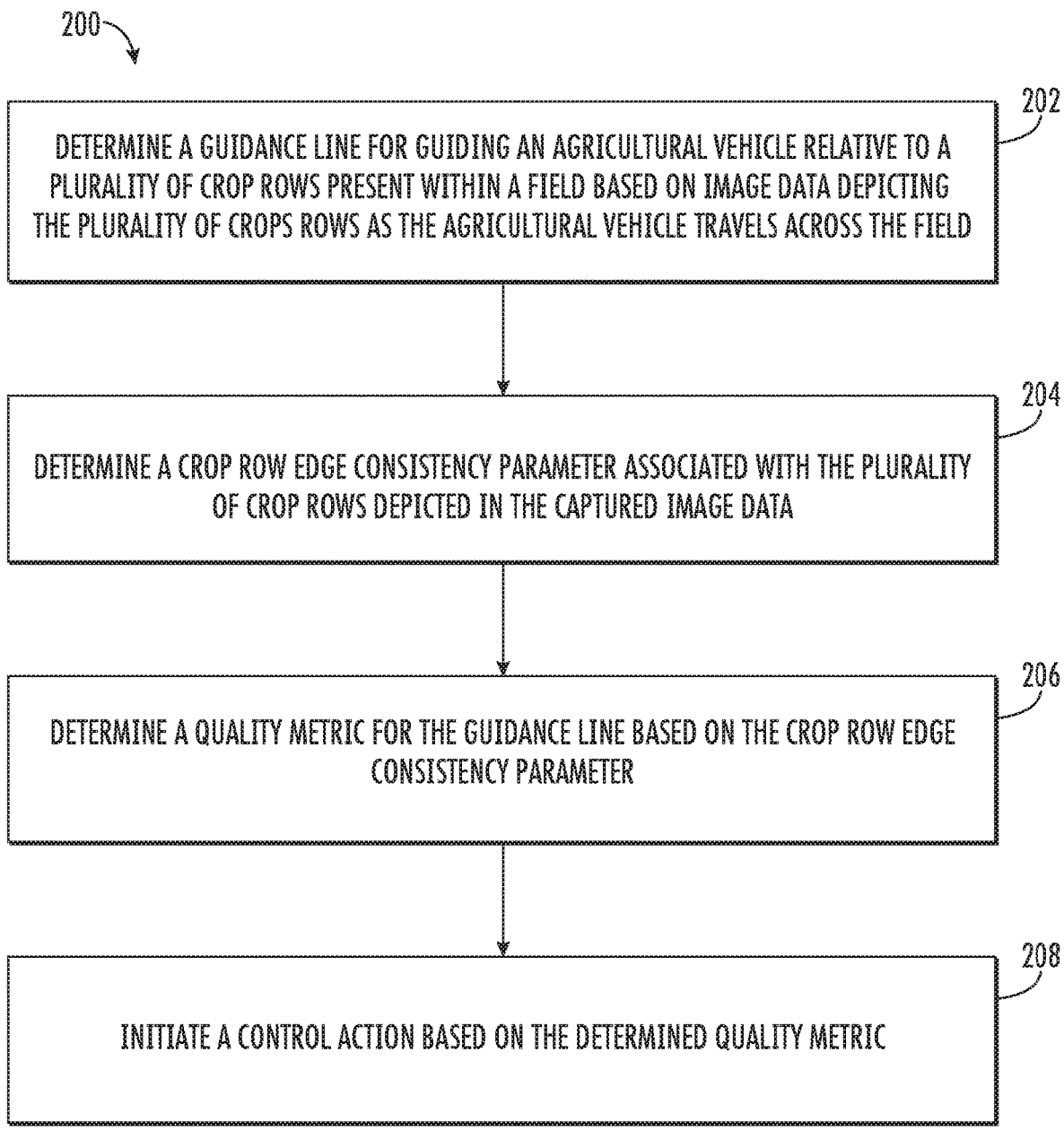
FIG. 5 illustrates a flow diagram of one embodiment of a method for determining agricultural vehicle guidance quality in accordance with aspects of the present subject matter.

Referring now to FIG. 5, a flow diagram of one embodiment of a method 200 for determining agricultural vehicle guidance quality is illustrated in accordance with aspects of the present subject matter. In general, the method 200 will be described herein with reference to the agricultural vehicle 10 and the system 100 described above with reference to FIGS. 1-4. However, it should be appreciated by those of ordinary skill in the art that the disclosed method 200 may generally be implemented with any vehicle having any suitable vehicle configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include determining, with one or more computing devices, a guidance line for guiding an agricultural vehicle relative to a plurality of crop rows present within a field based on image data depicting the plurality of crops rows as the agricultural vehicle travels across the field. For instance, as described above, the controller 106 may be configured to determine a guidance line for guiding the agricultural vehicle 10 relative to a plurality of crop rows based on image data depicting a plurality of crops rows present within a field captured by the imaging device(s) 102 as the vehicle 10 travels across the field.

Additionally, at (204), the method 200 may include determining, with the one or more computing devices, a crop row boundary consistency parameter associated with the plurality of crop rows depicted in the captured image data. For instance, as described above, the controller 106 may be configured to determine a crop row boundary consistency parameter associated with the plurality of crop rows depicted on the captured image data by the imaging device(s) 102.

Moreover, as shown in FIG. 5, at (206), the method 200 may include determining, with the one or more computing devices, a quality metric for the guidance line based on the crop row boundary consistency parameter. For instance, as described above, the controller 106 may be configured to determine a quality metric for the guidance line based on the crop row boundary consistency parameter.

Furthermore, at (208), the method 200 may include initiating, with the one or more computing devices, a control action based on the determined quality metric. For instance, as described above, the controller 106 may be configured to initiate one or more control actions based on the determined quality metric. In one embodiment, the control action(s) may include reducing the ground speed of the vehicle 10, such as by controlling the operation of the engine 34, the transmission 36, and/or the braking actuator(s) 38.

It is to be understood that the steps of the method 200 are performed by the controller 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 106 described herein, such as the method 200, is implemented in software code or instructions which are tangibly stored on a tangible computer readable medium. The controller 106 loads the software code or instructions via a direct interface with the computer readable medium or via a wired and/or wireless network. Upon loading and executing such software code or instructions by the controller 106, the controller 106 may perform any of the functionality of the controller 106 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining agricultural vehicle guidance quality, the system comprising:
    an imaging device configured to capture image data depicting a plurality of crops rows present within a field as an agricultural vehicle travels across the field; and
    a controller communicatively coupled to the imaging device, the controller configured to:
        determine a guidance line for guiding the agricultural vehicle relative to the plurality of crop rows based on the captured image data;
        determine a crop row boundary consistency parameter associated with one or more crop rows of the plurality of crop row present within a region of interest of the captured image data;
        determine a quality metric for the guidance line based on the crop row boundary consistency parameter;
        compare the determined quality metric to a predetermined minimum quality metric value; and
        when the determined quality metric falls below the predetermined minimum quality metric value, initiate a reduction in a ground speed of the agricultural vehicle.

2. The system of claim 1, wherein the crop row boundary consistency parameter comprises a weed coverage parameter.

3. The system of claim 2, wherein the weed coverage parameter comprises at least one of a number of pixels within the region of interest associated with inter-row weeds or a number of pixels within a region of interest associated with intra-row weeds.

4. The system of claim 1, wherein the crop row boundary consistency parameter comprises a crop health parameter.

5. The system of claim 4, wherein the crop health parameter comprises at least one of a crop color, a color height, or a crop canopy size.

6. The system of claim 1, wherein the crop row boundary consistency parameter comprises a crop row spacing consistency.

7. The system of claim 1, wherein the crop row boundary consistency parameter comprises a dynamic range variation of the region of interest.

8. The system of claim 1, wherein, when the determined quality metric falls below the predetermined minimum quality metric value, the controller is further configured to initiate notification to an operator of the agricultural vehicle indicating that the determined quality metric falls below the predetermined minimum quality metric value.

9. The system of claim 1, wherein, when the determined quality metric falls below the predetermined minimum quality metric value, the controller is further configured to adjust at least one of a size or position of the region of interest of the captured image data.

10. The system of claim 1, further comprising:
    a location sensor configured to capture location data indicative of a location of the agricultural vehicle within the field, wherein, after initiating the control action, the controller is further configured to:
        compare the determined quality metric to the predetermined minimum quality metric value; and
        when the determined quality metric falls below the predetermined minimum quality metric value, determine the guidance line based on the captured location data and a stored field map.

11. The system of claim 1, wherein the agricultural vehicle comprises a sprayer.

12. A method for determining agricultural vehicle guidance quality, the method comprising:
    determining, with one or more computing devices, a guidance line for guiding an agricultural vehicle relative to a plurality of crop rows present within a field based on the image data depicting the plurality of crops rows as the agricultural vehicle travels across the field;
    determining, with the one or more computing devices, a crop row boundary consistency parameter associated with the plurality of crop rows depicted in the captured image data;
    determining, with the one or more computing devices, a quality metric for the guidance line based on the crop row boundary consistency parameter;
    comparing, with the one or more computing devices, the determined quality metric to a predetermined minimum quality metric value; and
    when the determined quality metric falls below the predetermined minimum quality metric value, initiating, with the one or more computing devices, a reduction in a ground speed of the agricultural vehicle.

13. The method of claim 12, wherein the crop row boundary consistency parameter comprises a weed coverage parameter.

14. The method of claim 13, wherein the weed coverage parameter comprises at least one of a number of pixels within the captured image associated with inter-row weeds or a number of pixels within the captured image associated with intra-row weeds.

15. The method of claim 12, wherein the crop row boundary consistency parameter comprises a crop health parameter.

16. The method of claim 15, wherein the crop health parameter comprises at least one of a crop color, a color height, or a crop canopy size.

17. The method of claim 12, wherein the crop row boundary consistency parameter comprises a crop row spacing consistency parameter.

* * * * *